US007680924B2

(12) United States Patent  
Parupudi et al.

(10) Patent No.: US 7,680,924 B2
(45) Date of Patent: Mar. 16, 2010

(54) SYSTEM AND METHOD FOR DETERMINING WHETHER A NETWORK DESTINATION IS REACHABLE

(75) Inventors: Gopal Parupudi, Issaquah, WA (US); Mario C. Goertzel, Kirkland, WA (US); Murthy Srinivas, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1309 days.

(21) Appl. No.: 11/031,580

(22) Filed: Jan. 6, 2005

(65) Prior Publication Data

US 2005/0122910 A1    Jun. 9, 2005

Related U.S. Application Data

(62) Division of application No. 09/256,624, filed on Feb. 23, 1999, now Pat. No. 6,859,829.

(51) Int. Cl.
*G06F 15/173* (2006.01)
(52) U.S. Cl. .................. 709/224; 709/223; 709/245
(58) Field of Classification Search .......... 709/223, 709/224, 227, 241, 245; 370/254
See application file for complete search history.

(56) References Cited

U.S. PATENT DOCUMENTS

| 4,868,832 | A | | 9/1989 | Marrington |
| 5,247,517 | A | | 9/1993 | Ross |
| 5,537,549 | A | | 7/1996 | Gee |
| 5,742,833 | A | | 4/1998 | Dea et al. ................. 713/323 |
| 5,787,253 | A | | 7/1998 | McCreery et al. ......... 709/231 |
| 5,838,688 | A | | 11/1998 | Kadambi |
| 5,886,643 | A | | 3/1999 | Diebboll |
| 6,021,443 | A | * | 2/2000 | Bracho et al. ............. 709/241 |
| 6,038,542 | A | | 3/2000 | Ruckdashel |
| 6,058,420 | A | | 5/2000 | Davies .................... 709/224 |
| 6,061,723 | A | | 5/2000 | Walker et al. ............ 709/224 |
| 6,131,118 | A | | 10/2000 | Stupek, Jr. et al. ........ 709/223 |
| 6,185,613 | B1 | | 2/2001 | Lawson et al. ........... 709/224 |
| 6,298,378 | B1 | * | 10/2001 | Angal et al. ............. 709/223 |
| 6,314,533 | B1 | | 11/2001 | Novik |
| 6,321,338 | B1 | | 11/2001 | Porras |

(Continued)

OTHER PUBLICATIONS

Office Action dated Feb. 19, 2009 cited in U.S. Appl. No. 11/031,570.

(Continued)

*Primary Examiner*—Ramy M Osman
(74) *Attorney, Agent, or Firm*—Workman Nydegger

(57) ABSTRACT

A method and system for providing system event notifications to clients such as applications. Clients register for notification of one or more types of events with a registration mechanism, and a System Event Notification Service, (SENS), receives system event information and fires event notifications in response thereto. A distribution mechanism selectively communicates the fired event to each client registered for notification thereof based on the type of event. Events include network events, for which the service monitors the connectivity state of the machine, including whether a connection is established or lost, the type of connection (LAN/WAN) and bandwidth information. To monitor a LAN state, the service caches outgoing and incoming network information including errors and packet counts and statistically evaluates this cached information against current information to determine whether the connection is established or lost. The service also determines if a destination (IP address or name) is reachable, by periodically polling destinations. Other system event notifications may be fired, including logon or logoff operations and power management events.

9 Claims, 8 Drawing Sheets

U.S. PATENT DOCUMENTS

| | | | |
|---|---|---|---|
| 6,393,478 B1 * | 5/2002 | Bahlmann | 709/224 |
| 6,438,618 B1 | 8/2002 | Lortz | |
| 6,574,664 B1 * | 6/2003 | Liu et al. | 709/224 |
| 6,694,369 B1 * | 2/2004 | Vepa et al. | 709/203 |
| 7,028,229 B2 | 4/2006 | McGuire | |
| 7,051,105 B2 | 5/2006 | Lauzon | |
| 7,472,396 B2 | 12/2008 | Jacobs | |
| 2005/0117523 A1 | 6/2005 | Parupudi | |
| 2005/0122909 A1 | 6/2005 | Parupudi | |

OTHER PUBLICATIONS

Office Action dated Feb. 23, 2009 cited in U.S. Appl. No. 11/029,982.

Solstice Enterprise Manager Administration Guide, Release 2.0, SunSoft, 1996, pp. 11-33 to 11-35 and 14-33 to 14-35 (Internet: docs.sun.com).

Sohail Gani. "The object revolution. How COM technology is changing the way we do business" Computer & control Engineering Journal, Jun. 1995.

Notice of Allowance dated Sep. 9, 2009 cited in U.S. Appl. No. 11/029,982.

Notice of Allowance dated Sep. 29, 2009 cited in U.S. Appl. No. 11/031,570.

* cited by examiner

| Interface Number | a) Incoming Packet Count (non-Unicast) | b) Outgoing Packet Count (Unicast) | c) Incoming Errors | d) Outgoing Errors | e) Incoming Packet Count (non-Unicast) | f) Outgoing Packet Count (Unicast) |
|---|---|---|---|---|---|---|
| 2 | 1200 | 26 | 360 | 4 | 1660 | 84 |
| 6 | 900 | 22 | 65 | 2 | 2123 | 67 |
| 5 | 790 | 19 | 44 | 2 | 868 | 445 |
| 0 | 311 | 14 | 3 | 1 | 199 | 378 |

82T2

LAN Cache

*FIG. 5*

SYSTEM AND METHOD FOR DETERMINING WHETHER A NETWORK DESTINATION IS REACHABLE

CROSS REFERENCE TO RELATED APPLICATIONS

This application is a divisional application of U.S. patent application Ser. No. 09/256,624, filed Feb. 23, 1999. This application is related to co-pending divisional U.S. patent application Ser. No. 11/031,570, filed Jan. 6, 2005. This application is related to co-pending continuation U.S. patent application Ser. No. 11/029,982, filed Jan. 4, 2005.

TECHNICAL FIELD

The invention relates generally to computer systems, and more particularly to an improved method and mechanism for providing computer application programs with computer system events, including network events.

BACKGROUND OF THE INVENTION

At times, application programs need or could benefit from certain system event information. By way of example, an application program that deals with a network may need to determine if the network is available to that program, i.e., whether the computer system is connected to the network and the network is operational. Another application program, such as a word processing program, may benefit from knowing if the state of battery charge was getting critically low, whereby the application program could automatically save a copy of any open files.

To the extent that such system information may be obtained, the mechanisms for obtaining the information are independent within the various applications. For example, each application that deals with the network essentially implements its own technology to determine the state of network connectivity. Such technology uses often crude and incomplete heuristics for this purpose.

Moreover, because many system events such as battery low conditions and network disconnects can happen at any time, some regular calling or polling mechanism is generally needed to detect such conditions. However, such polling consumes resources, which is particularly wasteful since the result is usually unchanged. At the same time, individual polling is redundant. For example, if some system facility (such as an application programming interface, or API) reports the charge of the battery, a word processor, spreadsheet and another application each may be configured to separately and regularly poll the facility to determine the charge.

Particular problems arise with mobile computing, since in mobile computing environments, users often change the state of network connectivity. At the same time, local area network (LAN) connectivity is particularly difficult to detect, since there is not any uniform way to determine the state of LAN connectivity, e.g., LAN cards do not adequately provide the needed connectivity information. Simply monitoring for activity is not sufficient, since even if there is activity on a LAN interface, such activity may be only broadcast/loopback activity, and not indicative of real network connectivity. In short, applications heretofore have not had an integrated model for obtaining computer system event information, including network connectivity and other information.

SUMMARY OF THE INVENTION

Briefly, the present invention provides a method and system for providing system event notifications to clients such as applications. Clients register for notification of one or more types of events with a registration mechanism, and a System Event Notification Service, (SENS), receives system event information and fires events in response thereto. A distribution mechanism selectively communicates the fired event to each client registered for notification thereof based on the type of event. SENS preferably uses the Loosely Coupled Events database to match client subscribers interested in the information SENS is capable of publishing.

For network events, the System Event Notification Service monitors the connectivity state of the machine. SENS provides the connectivity state information via an application programming interface (API) or by sending notifications to subscribers via the distribution mechanism. The information may include whether the connection is established or lost, the type of connection (LAN/WAN) and bandwidth information. SENS also provides information on other system events, including logon or logoff operations and power management, and may be extended to provide other types of system event information such as notifications of plug and play operations.

To monitor a LAN state, SENS caches outgoing and incoming network information including errors and packet counts. SENS evaluates this cached information against current information to determine whether the connection is available or not and additionally to determine if a connection was established or lost. SENS also evaluates the WAN state if RAS (Remote Access Services) is installed. SENS further determines if a destination (IP address or name) is reachable, by periodically polling destinations, preferably via system threadpool timers. To monitor events such as logon/logoff or power management, SENS registers with the operating system. SENS may also interface with one or more other clients to delay logging off until the other client or clients can complete certain work.

Other advantages will become apparent from the following detailed description when taken in conjunction with the drawings, in which:

BRIEF DESCRIPTION OF THE DRAWINGS

FIG. 5 is a representation of a cache for maintaining local area network information to evaluate the network connectivity state in accordance with one aspect of the present invention;

DETAILED DESCRIPTION OF THE INVENTION

Exemplary Operating Environment

Figure 1:
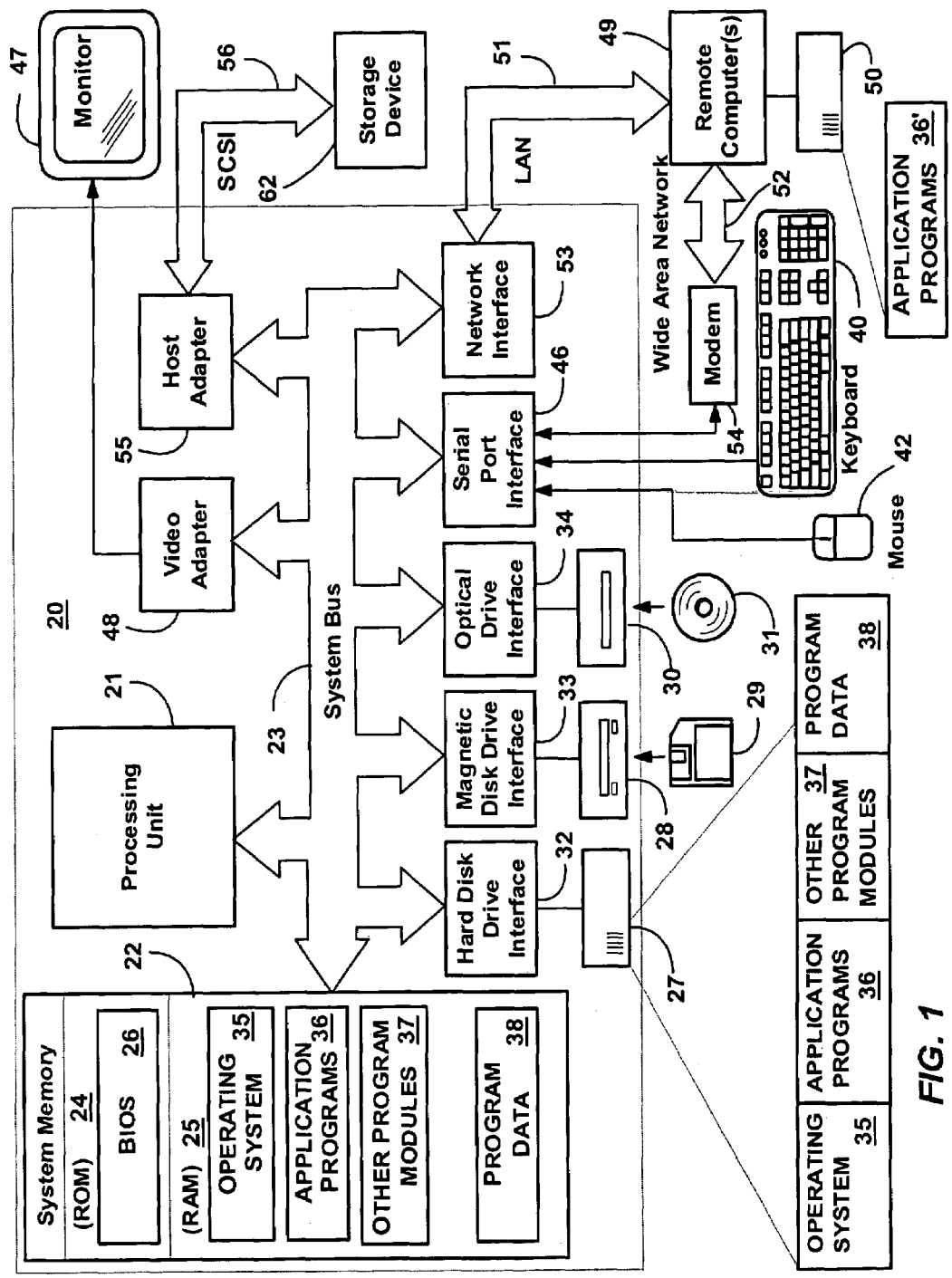
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows® 2000), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Event Notification

Figure 2:
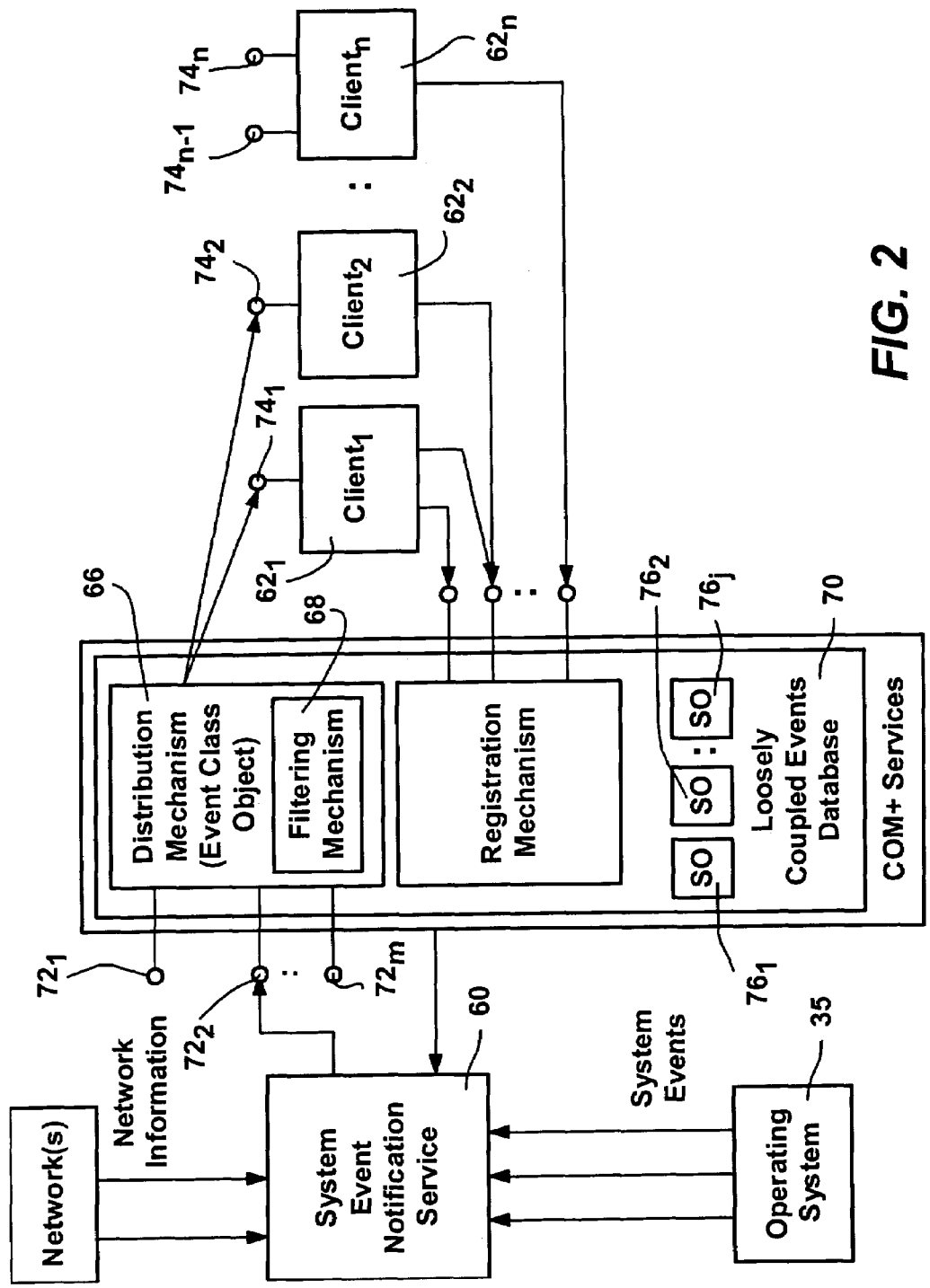
FIG. 2 is a block diagram representing general components for distributing system events to registered clients in accordance with one aspect of the present invention.

Turning now to FIG. 2, the System Event Notification Service 60 (SENS) is a centralized mechanism which publishes notifications to appropriate clients $62_1$-$62_n$. Clients are subscribers that essentially subscribe via a registration mechanism 64 for events in which they are interested. When the SENS 60 receives system event information corresponding to an event for which a client is registered, the SENS 60 fires an event to a distribution mechanism, preferably embodied in a COM object referred to as an event class object 66, which in turn publishes the event to only those client subscribers $62_1$-$62_n$ that are registered for that event. A filtering mechanism 68 may also be included as part of the event class object 66 or connected thereto, whereby certain events are filtered out based on client-specified conditions (i.e., parameters) that may be associated with an event. For example, the client can register for a notification of when the computer system is on battery power, but further specify that notification should only occur if the battery charge is at or below twenty percent. The filtering mechanism stops the fired event notification from reaching that client unless the battery charge is below the specified twenty percent level.

Although not necessary to the present invention, the registration mechanism 64, distribution mechanism (event class object) 66 and filtering mechanism 68 used by the SENS 60 are preferably incorporated into a COM+ events database-like technology generally referred to herein as the Loosely Coupled Events database 70. The Loosely Coupled Events database 70 and associated filtering mechanism 68 are described in more detail in copending United States patent applications, entitled "Object Connectivity Through Loosely Coupled Publish And Subscribe Events," and "Object Connectivity Through Loosely Coupled Publish And Subscribe Events With Filtering," respectively, both assigned to the assignee of the present invention, filed concurrently herewith, and hereby incorporated by reference herein in their entireties. These applications will hereinafter be referred to as the aforementioned "Loosely Coupled Events" applications.

Thus, aspects of the present invention are herein described with reference to the Loosely Coupled Events model, which is incorporated into an object services component of Microsoft Corporation's Windows® 2000 (server) operating system. In general, the Windows® 2000 operating system is a scaleable, high-performance network and computer operating system supporting distributed client/server computing, and provides an object execution environment for component applications, including those conforming to the component object model (COM). COM is described in detail in "*Inside OLE, Second Edition*", Kraig Brockschmidt, Microsoft Press (1995). The COM+ component incorporates object services that implement the illustrated publish and subscribe event communication model. As used herein, "COM" is used to refer to the object model defined in the Microsoft Component Object Model, whereas "COM+" refers to the system services, system-provided objects and system-defined interfaces of the COM+ object services component of Microsoft Windows® 2000. Notwithstanding, there is no intention to limit the present invention to the Windows® 2000 operating system, COM and/or COM+, but on the contrary, the present invention is intended to operate with and provide benefits with any mechanism that fires and distributes event notifications in response to receiving system information. For example, the present invention has also been implemented in Microsoft® Corporation's Internet Explorer 5.0 for Windows NT 4.0 and Windows® 95 and Windows® 98 operating systems.

The Loosely Coupled Events database 70 includes information about the event publisher (i.e., SENS), event subscribers, and filters. During setup, when Microsoft® Windows 2000® is installed or upgrades another operating system, the SENS 60 adds itself as a publisher to a COM+Events data store, and provides information on the classes of events that it monitors using a GUID for each class of events.

In the Loosely Coupled Events model, the SENS 60 is a publisher that fires events to the distribution mechanism, the aforementioned COM object referred to as the event class object 66. More particularly, the SENS 60 calls a method of an interface (e.g., $72_2$) of the event class object 66, which in turn handles the work of publishing the event to the client subscribers $62_1$-$62_n$ registered for the event. For purposes of simplicity herein, calling a method of a COM object will not be described in detail, since such an operation is well documented. The work performed by the event class object 66 includes retrieving subscription information, creating the client subscriber (object) if not running, and multi-casting the event via method calls to the individual subscribers.

More particularly, the event class object 66 (distribution mechanism) calls methods or APIs of the registration mechanism 64 (e.g., COM+ Events subscription retrieval/enumeration APIs) when an event is "fired" by the SENS 60, so as to pass the event to the appropriate subscribers to the event. Note that the interfaces $72_1$-$72_m$ of the event class object 66 are ordinarily defined by the developer of the SENS 60 publisher to handle the events fired thereby. Note further that the Loosely Coupled Events database 70 communicates with the SENS 60 so that certain types of events are not fired unless at least one client has registered for that type of event, since firing events can be costly in terms of consuming system resources.

The SENS 60 is an event publisher for the classes of events that it monitors, including network, logon, and power/battery events, and the client application program receiving a notification is called an event subscriber, as described below. While the SENS 60 is primarily for local system events, the distributed component object model (DCOM) enables the SENS 60 to be extended to network clients.

The client subscribers $62_1$-$62_n$ are also COM Objects in the Loosely Coupled Events model, each of which may have a subscription to a method or methods of the interface $72_2$. Application programs typically create a sink object (FIG. 3) to receive appropriate notifications. The subscriptions cause the event class object 66 of the Loosely Coupled Events database 70 to propagate events fired on the methods to the subscribers, shown in FIG. 2 as $62_1$-$62_2$, but not $62_n$. To this end, the client subscribers $62_1$-$62_2$ individually expose one or more interfaces, shown in FIG. 2 as the interfaces $74_1$-$74_n$. Each such interface is essentially defined identically to one of the interfaces $72_1$-$72_m$. The event class object 66 propagates the event by calling the method of each of the subscriber's interfaces (e.g., $74_1$ and $74_2$) that corresponds to the method called by the publisher in that event class object's interface (e.g., $72_2$).

Note that an application (e.g., its sink object receiving the notification) does not have to be active (running) when the notification is sent. When an application subscribes to receive notifications, the application may specify whether it should be activated when the event occurs or notified later when it is active. The subscription can be transient and valid only until the application stops running, or it can be persistent and valid until the application is removed from the system.

To selectively associate clients with events, the Loosely Coupled Events database 70 includes subscription objects $76_1$-$76_j$. Each object (e.g. $76_2$) associates a particular subscriber (e.g., client $62_1$) and a particular method of an event interface (e.g. $72_2$) of a particular event class object, (e.g., the event class object/SENS distribution mechanism 66). To create the subscription/association, the registration mechanism 64 includes COM+services in the form of methods or APIs that can be called to register, remove or modify subscriptions, (as well as to retrieve or enumerate subscriptions to a particular outgoing-event interface method). More particularly, each client subscribes to the SENS events that interest it via IEventSubscription and IEventSystem interfaces in the COM+ Events registration mechanism 64. An identifier for the event classes is supplied, along with the SENS publisher identifier, SENSGUID_PUBLISHER. Subscriptions are on a per-event level, whereby the subscribing application also specifies which events within the class are of interest thereto. As described above, each event corresponds to a method in the interface corresponding to its event class.

The client subscriber objects 62₁-62ₙ may implement the code that calls the method or API of the registration mechanism 64 for registering a subscription, so as to subscribe to a particular interface method. Alternatively, other programs may use the subscription registration method or API of the registration mechanism 64 to enter a subscription for a subscriber object. Accordingly, the clients 62₁-62ₙ need not include code to register a subscription. Instead, subscriptions can be entered for the client subscriber object (e.g., 62₂) by other programs. For example, an installation program that is run at installation of the subscriber object on the computer system 20 may enter a subscription, as may other component programs of an application that incorporates the subscriber object. Similarly, an administration utility such as "Microsoft Management Console," may configure subscriptions for the subscriber object. Additional details on publishers, the event class object, subscribers, and subscriptions are set forth in the aforementioned "Loosely Coupled Events" patent applications.

Thus, the SENS 60 enables applications to receive notifications from system events that SENS 60 monitors. When the requested event occurs, the SENS 60 notifies the application. At present, the SENS 60 can notify applications about three classes of system events, including TCP/IP network events, such as the status of a TCP/IP network connection or the quality of the connection, user logon events, and battery and AC (alternating current) power events.

An application can subscribe to multiple system events, such as establishment of network connectivity, notification when a specified destination can be reached within specified Quality of Connection (QOC) parameters, and when the computer has switched to battery power. The application can also subscribed to be notified when the percentage of remaining battery power is within a specified parameter, or when other scheduled events occur.

In accordance with one aspect of the present invention, one way in which a client (e.g., application) can determine network connectivity information is via application programming interfaces to the SENS 60, IsNetworkAlive( ) and IsDestinationReachable( ). The IsNetworkAlive( ) function determines whether the local system is connected to a network and the type of network connection, for example, LAN, WAN, or both. The IsDestinationReachable( ) function determines if the specified destination can be reached, and provides Quality of Connection (QOC) information for the destination. Additional details are set forth below:

```
Bool IsNetworkAlive(
    LPDWORD lpdwFlags    // Specifies the type of network connection
);
```

Parameters lpdwFlags
Provides information on the type of network connection available when the return value is TRUE. The flags can be:

NETWORK_ALIVE_LAN
the computer has one or more LAN cards that are active.

NETWORK_ALIVE_WAN
the computer has one or more active RAS connections.

Return Values

TRUE
The local system is connected to a network.

FALSE
Call GetLastError to determine the reason for no connectivity.

Remarks
This function is used by applications that want to know whether there is network connectivity before proceeding with network operations. Applications such as directory service applications, e-mail clients, or Internet browsers can adapt to various kinds of network connectivity. For example, a printing operation can be deferred until the network connection is available. Note that at present, this function is only available for TCP/IP connections.

```
Bool IsDestinationReachable(
    LPCSTR lpszDesination,    // Pointer to string specifying
destination
    LPQOCINFO lpQOCInfo       // Pointer to Quality of Connection
information
);
```

Parameters lpszDestination
Pointer to a string that specifies the destination. The destination can be an IP address, a UNC name, or an URL.

lpQOCInfo
Pointer to the QOCINFO structure that receives the Quality of Connection (QOC) information. You can supply a NULL pointer if the QOC information is not desired.

Return Values

TRUE
The destination can be reached.

FALSE
Call GetLastError to determine the reason why the destination cannot be reached.

Remarks
This function is used by client applications to determine the QOC information before proceeding with network operations. For standalone computers that are directly connected to the network through a network card or remote access server (RAS), this function generates minimal network traffic with RPC calls to the nearest router. For computers that are part of a network where the destination can be reached using RAS or a network gateway, this function pings to the destination to generate accurate QOC information. Note that at present, this function is only available for TCP/IP connections.

The caller supplies the buffer for the QOCINFO structure and must release this memory when it is no longer needed.

The QOCINFO structure is returned by the IsDestinationReachable function and provides Quality of Connection information to the caller.

```
typedef struct tagQOCINFO {
    DWORD    dwSize;
    DWORD    dwFlags;
    DWORD    dwInSpeed;
    DWORD    dwOutSpeed;
} QOCINFO, *LPQOCINFO;
```

Members dwSize

Upon calling the IsDestinationReachable function, the caller supplies the size of the QOC structure in this member. On return from the function, this member contains the actual size of the structure that was filled in.

dwFlags

Speed of connection. Flag bits indicate whether the connection is slow, medium, fast.

dwInSpeed

Speed of data coming in from the destination in bytes per second.

dwOutSpeed

Speed of data sent to the destination in bytes per second.

Figure 3:
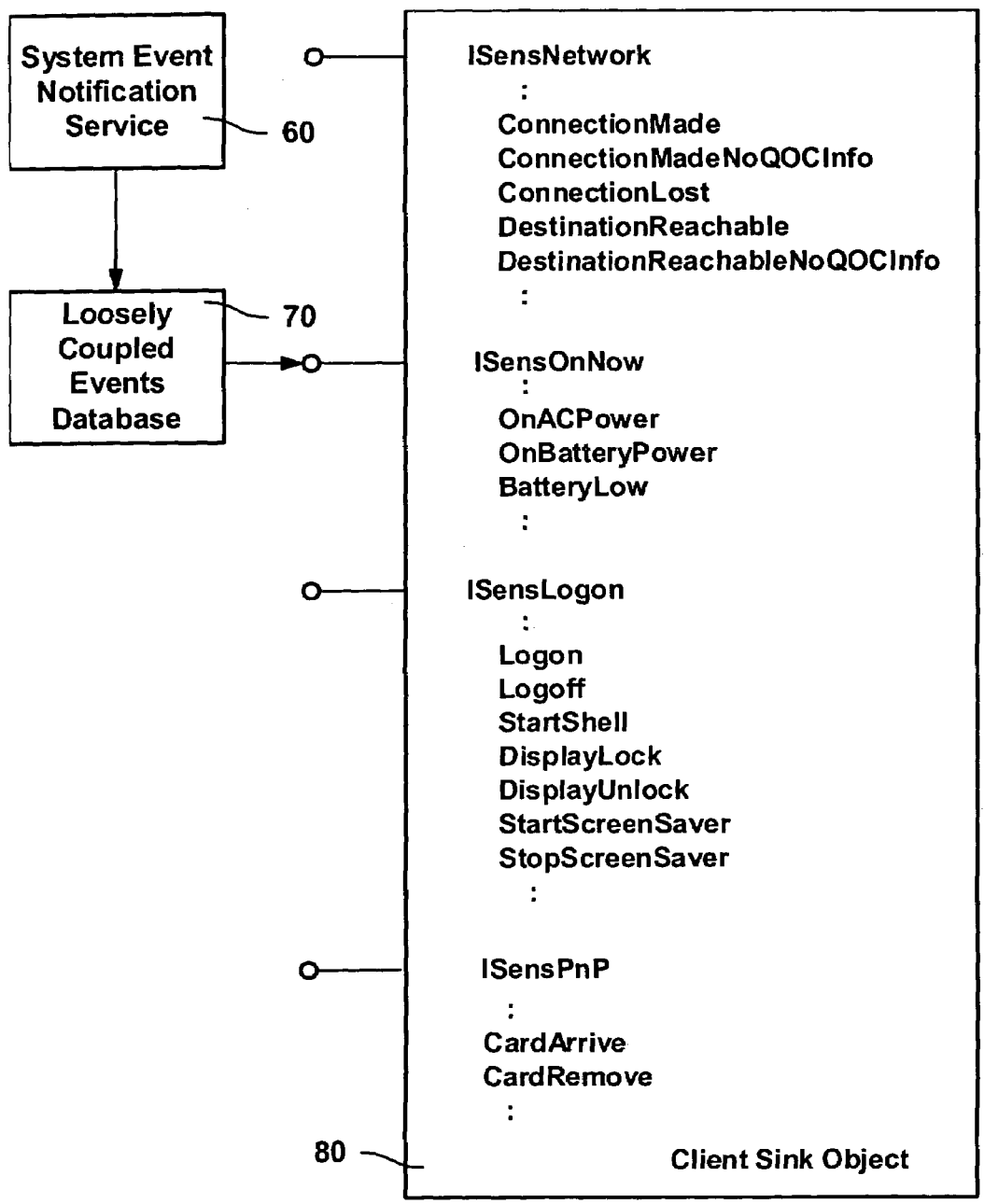
FIG. 3 is a block diagram representing a centralized service and mechanism for firing event notifications, and interfaces in a client registered for notifications, in accordance with one aspect of the present invention.

In accordance with another aspect of the present invention, another way in which a client (e.g., application) receives system events is by subscribing a sink object 80 or the like for notifications of events that interest it. As shown in FIG. 3, the subscriber application creates a sink object 80 with an implementation for each interface that it handles. The various types of event's are generally categorized into appropriate interfaces, i.e., network-type events in one interface, power-type events in another interface, logon-type events in another interface and so on. FIG. 3 shows such a client subscriber sink object 80 set up to receive a relatively large number of SENS events, including network-type events via an ISensNetwork interface, power-type events via an ISensOnNow interface and logon-type events via an ISensLogon interface. Also, plug-and-play type events may be handled by the SENS 60, and although not presently implemented, are shown herein to illustrate the extensibility of the present invention by simply adding additional interfaces such as ISensPnP with appropriate methods. Of course, a typical sink object ordinarily will not implement this many events, however FIG. 3 illustrates many of the possible events. The SENS 60 predefines an outgoing interface for each event class in a type library, as set forth in Table 1 below:

TABLE 1

| Event Class | GUID | Interface |
| --- | --- | --- |
| Network events | SENSGUID_EVENTCLASS_NETWORK | ISensNetwork |
| Logon events | SENSGUID_EVENTCLASS_LOGON | ISensLogon |
| Power events | SENSGUID_EVENTCLASS_ONNOW | ISensOnNow |

The SENS 60 defines the SENS coclass as part of the SENS type library. The SENS object implementation is provided by the operating system, as set forth in Tables 2 and 3 below.

TABLE 2

| Creation/Access Functions | |
| --- | --- |
| CoCreateInstance | Creates an instance of the SENS object using its CLSID. |

TABLE 3

| Interfaces | |
| --- | --- |
| ISensNetwork | Default. Outgoing interface implemented by sink object in subscriber application. |

TABLE 3-continued

| Interfaces | |
| --- | --- |
| ISensOnNow | Outgoing interface implemented by sink object in subscriber application. |
| ISensLogon | Outgoing interface implemented by sink object in subscriber application. |

The ISensNetwork interface handles network events fired by the SENS 60. Each event corresponds to a method in the ISensNetwork interface, an outgoing interface defined by the SENS 60 and implemented by the subscriber application as a dispatch interface. The following table, Table 4, sets forth the methods of the ISensNetwork interface that correspond to network events:

TABLE 4

| ISensNetwork Methods | Description |
| --- | --- |
| ConnectionMade | Specified connection has been established. |
| ConnectionMadeNoQOCInfo | Specified connection has been established with no Quality of Connection information available. |
| ConnectionLost | Specified connection has been dropped. |
| DestinationReachable | Specified connection can be reached. |
| DestinationReachableNoQOCInfo | Specified connection can be reached with no Quality of Connection information. |

Additional details on some of the methods of the ISensNetwork interface are set forth below:

ISensNetwork::ConnectionMade

The specified connection has been established.

```
HRESULT ConnectionMade(
    BSTR bstrConnection,         // Connection name
    ULONG ulType,                // Connection type
    LPSENS_QOCINFO lpQOCInfo     // Pointer to Quality of Connection
                                 // information
);
```

Parameters bstrConnection

[in] The name of the connection. For WAN connections, the connection name is the name of the phone book entry; for LAN connections, it is the name of the network card.

ulType

[in] Connection type. This value can be CONNECTION_LAN or CONNECTION_WAN.

lpQOCInfo

[out] Pointer to the SENS QOCINFO structure which contains Quality of Connection information.

Dispatch Identifier

[id(0x00000001)]

Return Values

S_OK

Method returned successfully.

Remarks—SENS calls this method to notify an application that the specified connection has been established. SENS also provides a pointer to a structure containing Quality of Connection information.

Note that at present, this function is only available for TCP/IP connections.

SENS_QOCINFO Structure

The SENS_QOCINFO structure is provided by the ISensNetwork::ConnectionMade method and the ISensNetwork::DestinationReachable method. This structure contains Quality of Connection information to the sink object in an application that subscribes to the System Event Notification Service (SENS).

```
typedef struct _SENS_QOCINFO {
    DWORD dwSize;
    DWORD dwFlags;
    DWORD dwOutSpeed;
    DWORD dwInSpeed;
} SENS_QOCINFO;
```

Members dwSize

This member contains the actual size of the structure that was filled in.

dwFlags

Speed of connection. Flag bits indicate whether the connection is slow, medium, fast.

dwOutSpeed

Speed of data sent to the destination in bits per second.

dwInSpeed Speed of data coming in from the destination in bits per second.

ISensNetwork::DestinationReachable

Directed to whether a specified connection can be reached.

```
HRESULT DestinationReachable(
    BSTR bstrDesination,         // Destination name
    BSTR bstrConnection          // Connection name
    ULONG ultype                 // Connection type
    LPSENS_QOCINFO lpQOCInfo     // Quality of Connection
                                 //   information
);
```

Parameters bstrDestination

[in] Name of the destination. The name may be an IP address, a URL, a UNC, or a NetBIOS name.

bstrConnection

[in] Name of the connection. For WAN connections, the connection name is the name of the phone book entry; for LAN connections, it is the name of the network card.

ulType

[in] Connection type. This value can be CONNECTION_LAN or CONNECTION_WAN.

lpQOCInfo

[out] Pointer to the SENS_QOCINFO structure which contains Quality of Connection information.

Dispatch Identifier
[id(0x00000004)]

Return Values

S_OK
Method returned successfully.

Remarks

SENS calls this method to notify an application that the specified destination can be reached. A pointer to a structure containing Quality of Connection information is also provided.

Note that at present, this function is only available for TCP/IP connections.

ISensNetwork::DestinationReachableNoQOCInfo

The specified connection can be reached with no Quality of Connection information.

```
HRESULT DestinationReachableNoQOCInfo(
    BSTR bstrDesination,     // Destination name
    BSTR bstrConnection,     // Connection name
    ULONG ultype             // Connection type
);
```

Parameters bstrDestination

[in] The name of the destination. Can be an IP address, a URL, a UNC, or a NetBIOS name.

bstrConnection

[in] Name of the connection. For WAN connections, the connection name is the name of the phone book entry; for LAN connections, it is the name of the network card.

ulType

[in] Connection type. This value can be CONNECTION_LAN or CONNECTION_WAN.

Dispatch Identifier
[id(0x00000005)]

Return Values

S_OK
Method returned successfully.

Remarks

SENS calls this method to notify an application that the specified destination can be reached when Quality of Connection information is not available.

Note that at present, this function is only available for TCP/IP connections.

Several types of applications, for example, can utilize the connectivity functions and notification services that the SENS 60 offers. These include an application that requires network connectivity status, such as an application that utilizes directory services, or an application that adapts its operations depending on the level of connectivity and the quality of network services, such as an Internet browser that functions at a reduced level on a low bandwidth connection. Other applications that may benefit from this information include an application that can perform deferred operations, such as an electronic mail program that can queue messages while offline and send them when a connection is established.

Connectivity functions and notifications are also useful for certain computer configurations, such as a mobile computer used in a docking station on a high bandwidth network which may occasionally use a dial-in connection, a mobile computer using a dial-in connection exclusively, a desktop computer using a dial-in connection exclusively or a desktop computer connected to a high bandwidth network with latency issues. In each of these configurations, the connection bandwidth and latency information can be used by an application to dynamically optimize its operations for network availability.

Figure 4:
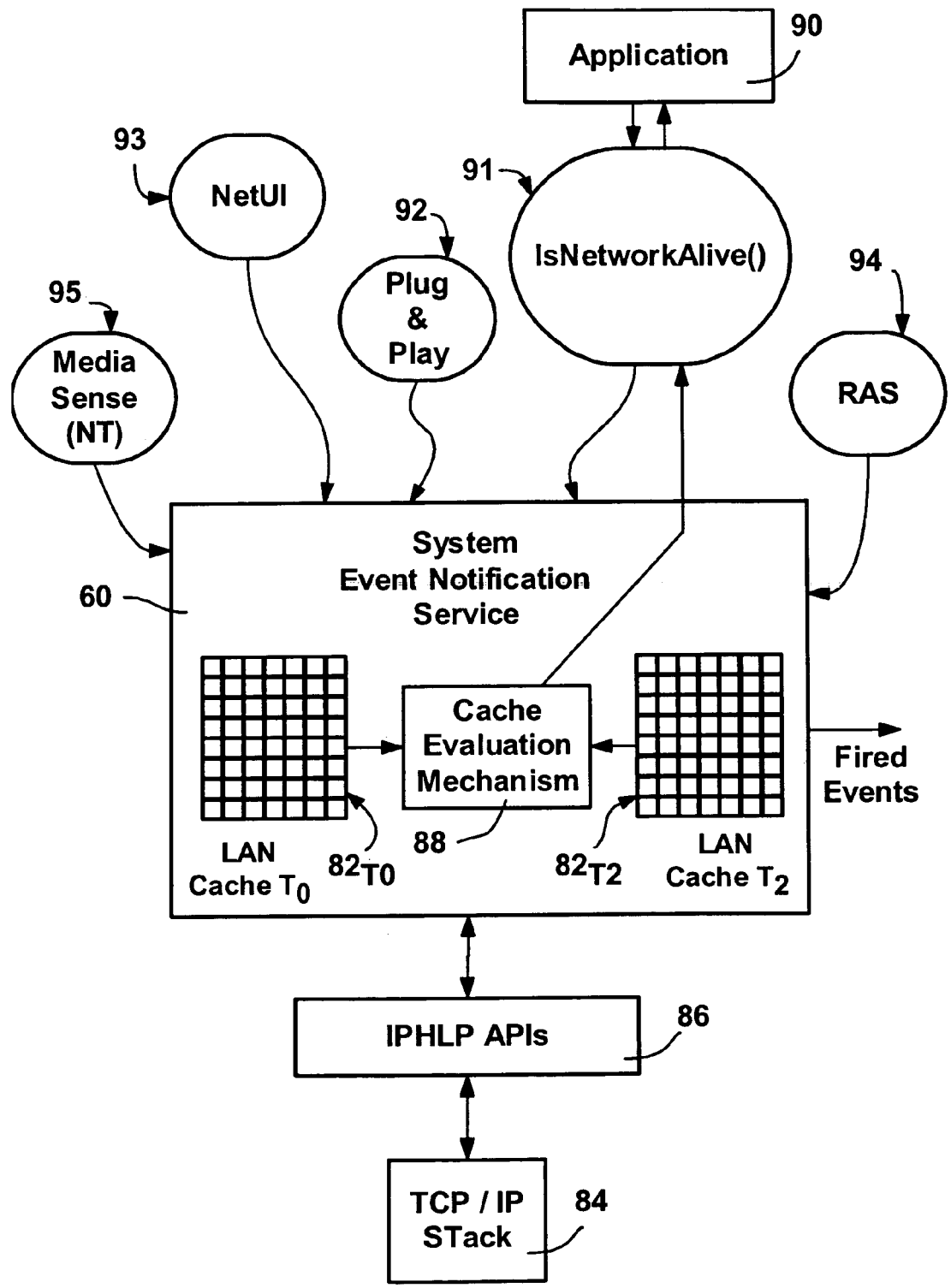
FIG. 4 is a block diagram representing sources for triggering a network connectivity state evaluation and components therefor in accordance with one aspect of the present invention.

As described above, LAN cards in general do not provide the appropriate LAN connectivity information needed to appropriately fire system events related thereto. However, in accordance with one aspect of the present invention, the SENS 60 provides a mechanism for detecting the network connectivity state, so that it can appropriately fire events in response to state changes. To this end, as shown in FIGS. 4 and 5, the SENS 60 caches network information in time-based caches $82_{T0}$ and $82_{T2}$. The cached information includes Unicast and non-Unicast incoming and outgoing network packet counts and incoming and outgoing error counts. These counts start at zero when the machine is last rebooted, and never decrease (until the next reboot). For each interface, this information is maintained as part of a TCP/IP stack 84 and made accessible through Internet Protocol Help (IPHLP) APIs 86. As described below, a snapshot is taken of the network information at two distinct times to fill the LAN caches $82_{T0}$ and $82_{T2}$, and the differences in counts evaluated by an evaluation mechanism 88 within the SENS 60 to determine network connectivity, i.e., whether the network is alive (true) or not (false).

Figure 6:
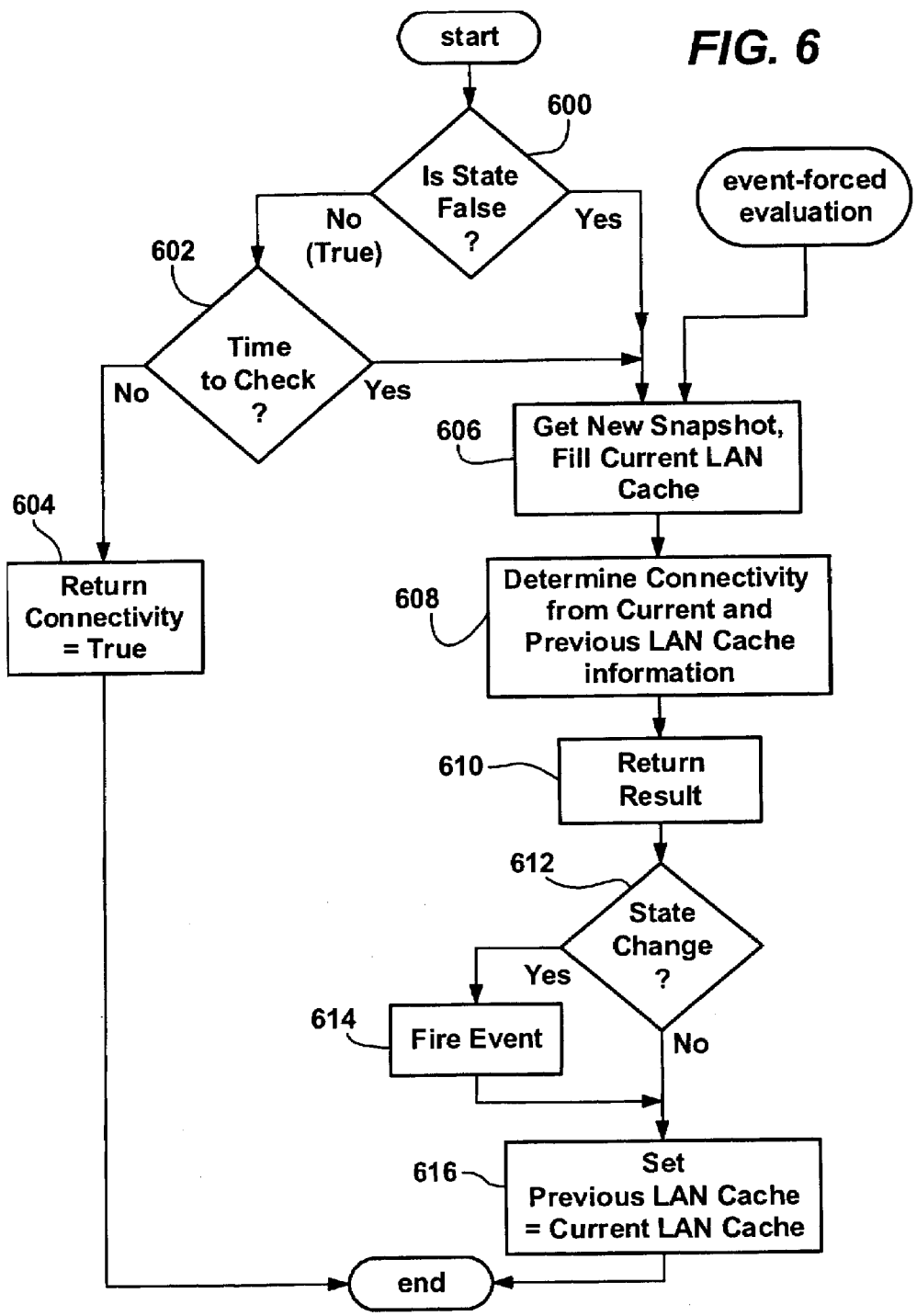
FIG. 6 is a flow diagram generally representing the steps taken to evaluate the connectivity state of a local area network and for firing corresponding network system events in accordance with one aspect of the present invention.

FIG. 6 shows the general process for determining network connectivity, beginning at step 600. One way to trigger the steps of FIG. 6 is when an application program 90 (FIG. 4) or the like calls the above-described IsNetworkAlive( ) API 91, requesting the network connectivity state information. Also, the SENS 60 can periodically check the state (e.g., once every two minutes) and appropriately fire events on state changes to registered clients. Certain other activities can also trigger the evaluation of network connectivity, as represented in FIG. 4 by ovals 92-95. These include plug and play events 92 directed to a LAN card, since plugging or unplugging such a card is likely to change the state of network connectivity. Similarly, certain network user interface activity 93, wherein a user can specifically ask to change the network connectivity state, may trigger a reevaluation. Remote Access Services (RAS) events 94 and Media Sense activity 95 can also trigger a reevaluation of network connectivity. Note that RAS may directly provide event information indicating whether a WAN connection is alive, which the SENS 60 then utilizes to fire events. Further, note that these other events essentially enter the reevaluation process at step 606, while the API call initially evaluates the last state by entering the process at step 600. Thus, when an API calls triggers the reevaluation, as an optimization, the network connectivity is not checked if it is alive (true) and has been checked recently, since networks do not fail often and evaluating the network information is relatively expensive. However, the network information is evaluated if false, or if one of the certain circumstances (described above) has taken place, since those events tend to happen when the network connectivity state changes, regardless of when last checked.

If during the IsNetworkAlive( ) API call the network state was last determined to be true, step 600 branches to step 602 to test if the time duration, i.e., the current time minus the previous time $T_0$, presently selected in one embodiment at 180 seconds, has been achieved since the last time connectivity was evaluated. If the duration is less than a threshold time, i.e., $T_1 < T_0 + 180$, it is not yet time to check, whereby step 602 branches to step 604 where a "True" network state is returned. Alternatively, as shown in FIG. 6, if the network state is "False" (step 600) or if the time to check has been achieved ($T_2 >= T_0 + 180$) at step 602, step 606 is next executed to fill a time-based cache $82_{T2}$ with network information at the current time, $T_2$. Note that the first time, (since reboot), the state is assumed to be false, whereby an evaluation of the network information will take place.

As described above and as represented in FIG. 5, each cache (e.g., $82_{T2}$) includes various packet and error counts. At step 606, the current cache $82_{T2}$ is evaluated against a previous cache $82_{T0}$ having the same count information therein, although current interfaces may have been added or removed since the time $T_0$. Note that if the cache $82_{T0}$ at time $T_0$ is too old or suspect, i.e., few if any of the interfaces are the same, the previous cache $82_{T0}$ can be scrapped, the current cache $82_{T2}$ can become the previous cache $82_{T0}$, and after (possibly) a short delay, new current counts can be obtained which become the values in the current cache $82_{T2}$. In any event, the values cached in the cache $82_{T2}$ are statistically evaluated against those in the cache $82_{T1}$ to determine if the network connectivity has changed.

In general, if an incoming packet count has increased from time $T_2$ to $T_0$, and the errors are low, the network is alive, to a high degree of certainty. Conversely, if the outgoing packet counts have increased but the corresponding incoming counts have not relatively increased, the network is likely not alive. For example, to determine network connectivity, if unicastIN and unicastOUT have changed, the network is considered to be alive. Also, if unicastIN and unicastOUT have both not changed, AND broadcastIN and non-unicastOUT have changed by different amounts, the network is considered to be alive. However, if broadcastIN and non-unicastOUT have changed by the same amounts, it is just broadcast activity (e.g., the network tap has probably been pulled out), whereby the network is considered to be not alive. Moreover, if the Errors IN/OUT or discards IN/OUT have changed, the network is most likely alive and is thus considered as such.

Once the state is determined, in the API call step 610 is executed top return the state as a result to the calling application. Step 612 is then executed to determine if the state has changed from its previous true or false value. If the state has changed, the SENS 60 fires the event, NetworkAlive (if True) or NetworkNotAlive (if false), to provide the current state via the Loosely Coupled Events database 70 to the clients registered therefor. Lastly, at step 616, this current state is maintained as the previous state and the current cache as the previous cache to be available for the next evaluation.

In accordance with another aspect of the present invention, the SENS 60 also provides an event and/or API response as to whether a particular network destination is reachable. Applications can call the IsDestinationReachable( ) API or register for DestinationReachable change events. By way of example, rather than simply knowing whether the network is alive, an electronic mail program may want to know whether its mail server is reachable. To this end, the electronic mail program calls the IsDestinationReachable( ) API or registers (typically at installation time) with the Loosely Coupled Events database 70 for "DestinationReachable" notifications, and provides the name of the mail server. The Loosely Coupled Events database 70 then informs the SENS 60, whereby the SENS 60 will find out and thereafter monitor this destination. The SENS 60 then fires events when the state of the mail server switches from reachable to not reachable and vice-versa.

Figure 7:
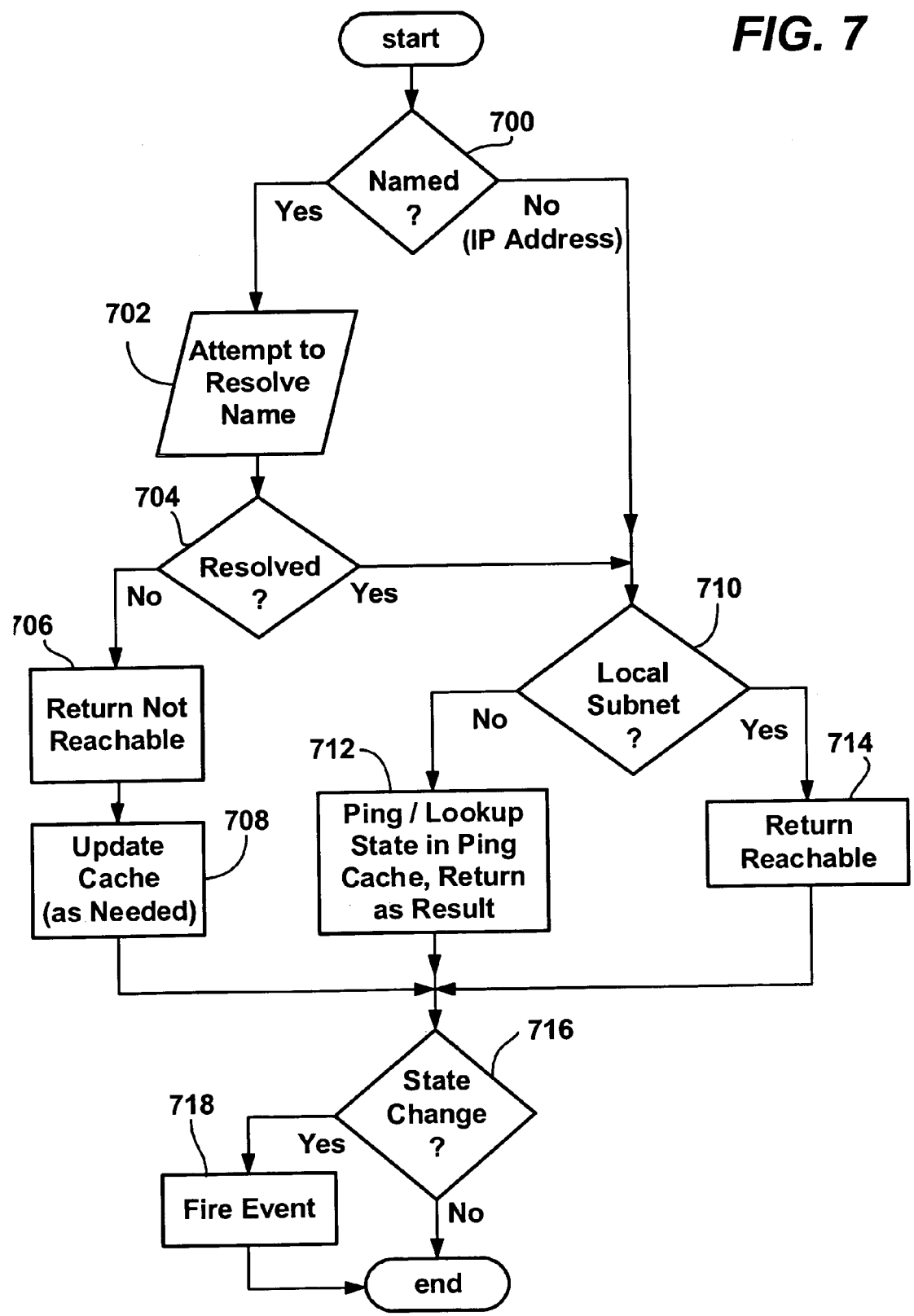
FIG. 7 is a flow diagram generally representing the steps taken to determine whether a specified network destination is reachable and for firing corresponding network system events in accordance with one aspect of the present invention.

To determine destination reachability, the SENS 60 essentially executes the steps of FIG. 7, beginning at step 700 where a test is made as to whether the destination is named or is in the form of an IP address. If named, the SENS 60 attempts to resolve the name, i.e., by calling external TCP/IP name resolution APIs, and obtaining a result at step 702. If unable to be resolved, step 704 branches to step 706 where the "not reachable" result is returned to the calling program (if called as an API). A "Ping" cache 98 (FIG. 8) is updated at step 708 to reflect the unreachable state before branching to step 716, described below.

If the IP address is known, either at step 700 or via steps 702-704, step 710 then tests to determine if the IP address corresponds to a local subnet (known from the value of the address). If so, then the destination is automatically considered reachable, and the reachable result is returned to the calling program (if called as an API) before branching to step 716, described below. Note that when a destination is considered reachable by the SENS 60, it is not a guarantee of reachability to an application. However local subnets are worth trying, and thus a "reachable" result is returned.

If the IP address does not correspond to a local Subnet, at step 710, the destination may be pinged (i.e., a packet sent thereto) to see if it responds, whereby it is known whether it is reachable. However, rather than ping each time, the ping cache 98 may be maintained that keeps the reachable/unreachable states of one or more destinations therein. The ping cache 98 is regularly updated while the network is alive, for example, each destination in the ping cache 98 is pinged once every five minutes. The last pinged state for the appropriate destination is returned at step 714 to the application calling the API, although as can be appreciated, alternatively the API call can force the ping.

Steps 716 and 718 cause an event to be fired to registered clients if a state change has occurred. For example, a name that previously was not resolvable is now resolved and it is in the local Subnet, or now responds when pinged, or a destination that formerly responded to pings no longer responds. Note that as also represented in FIG. 7, the ongoing monitoring process of the SENS 60 essentially pings each registered destination on a regular basis and then performs the steps 716-718 to determine whether to fire an event.

Figures 8, 9:
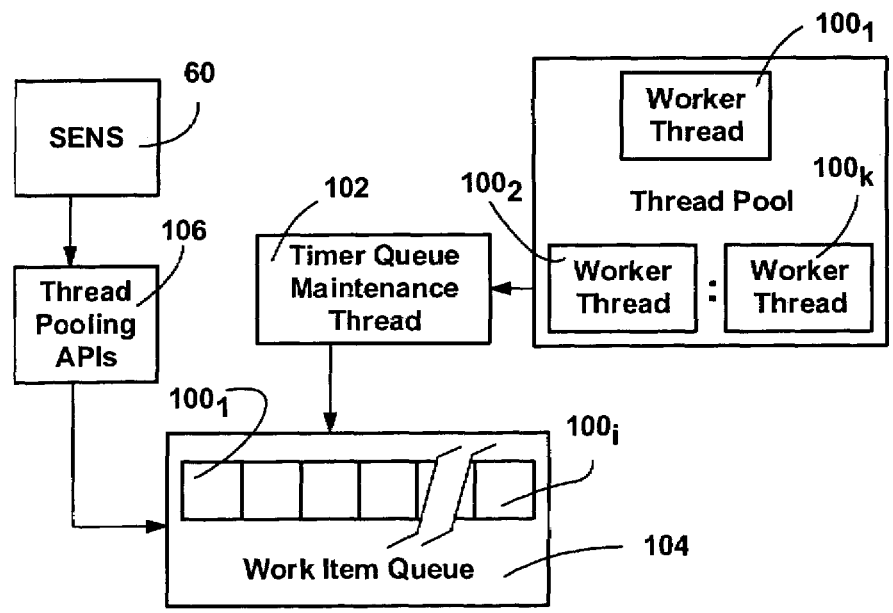
FIG. 8 is a representation of a cache for periodically polling network destinations to determine the reachability thereof.
FIG. 9 is a representation of a thread pooling arrangement useful for periodically polling network destinations to determine the reachability thereof.

A simple way in which to ping destinations is to keep a list of destinations and their corresponding reachable or unreachable states in the ping cache 98 as shown in FIG. 8. Then, a thread unblocks and executes once every time period (e.g., five minutes), and loops through the list by pulling each destination off of the list and essentially executing the steps of FIG. 7 therefor, writing any changed result into the ping table 98. The thread then blocks until again needed.

However, while effective, the simple looping mechanism wastes a thread since most of the time the thread is idle while blocking. A more efficient way to perform the same pinging loop is to use thread pooling. In thread pooling, each executable is assigned a number of threads $100_1$-$100_k$, (e.g., three or four), plus a single thread (DLL) 102 which maintains a timer queue 104 of timed work items, one-time queued work items, and/or wait-based work items that wait on an event. At present, this provides the ability to wait on sixty-two objects with one thread 102. The SENS 60, using thread-pooling APIs 106, registers each destination to ping as a work item $102_1$-$102_i$ with the operating system, along with any wait-based work items such as RAS connect and disconnect. The single thread 102 allocates one or more worker threads (e.g., $100_1$) to work items $102_1$-$102_i$ in the queue 104 as appropriate, i.e., once every time period for ping work items, whereby the pinging operation takes place. When not pinging, threads may be thus allocated to other processes rather than blocking.

In accordance with another aspect of the present invention, the SENS 60 provides notifications of AC and battery power events reported by the operating system 35. The ISensOnNow interface is implemented by clients interested in any of the SENS power events. As described above, this interface is an outgoing interface defined by SENS and implemented by the subscriber application as a dispatch interface. As also described above, when registering for battery low notifications, clients can specify filtering information. Each SENS power event corresponds to a method in the ISensOnNow interface, set forth below in Table 5:

TABLE 5

| ISensOnNow Methods | Description |
| --- | --- |
| OnACPower | Switched to AC power. |
| OnBatterypower | Switched to Battery power. |
| BatteryLow | Battery power is low. |

Additional details for some of the methods of the ISensOnNow interface are set forth below:

ISensOnNow::OnACPower

SENS calls this method to notify your application that the computer is using AC power.

HRESULT OnACPower(void);

Dispatch Identifier
   [id(0x00000001)]

Return Values

S_OK
   Method returned successfully.

Remarks

SENS calls this method to notify an application that AC power has been activated. If an application subscribes to this event, there are no filters to specify.

ISensOnNow::OnBatteryPower

SENS calls this method to notify an application that the computer is using battery power.

HRESULT OnBatteryPower(
   DWORD dwBatteryLifePercent    // Percent of battery power remaining
);

Parameters dwBatteryLifePercent
   [in] Specifies the percent of battery power remaining.

Dispatch Identifier
   [id(0x00000002)]

Return Values

S_OK
   Method returned successfully.

Remarks

SENS calls this method to notify an application that the computer is using battery power. The remaining percentage of battery power is specified. If an application subscribes to this event, there are no filters to specify.

The SENS 60 also handles additional notifications related to various system states via the ISensLogon interface. If any clients are interested, the SENS 60 centrally registers to find out about these events with the operating system/Winlogon service. The client application registers for these notifications and implements this ISensLogon interface as described above, whereby the SENS 60, via the Loosely Coupled Events database 70, calls the ISensLogon methods on the appropriately registered sink object to fire the corresponding event. The following table, Table 6, describes these events:

TABLE 6

| ISensLogon Methods | Description |
| --- | --- |
| Logon | A user has logged on. |
| Logoff | A user has logged off. |
| StartShell | Shell has been started. |
| DisplayLock | Screen display has been locked. |
| DisplayUnlock | Screen display has been unlocked. |
| StartScreenSaver | Screen saver has been started. |
| StopScreenSaver | Screen saver has been stopped. |

Lastly, the SENS 60 provides a special facility that may be used just before logoff, such as for synchronization purposes. As with logon, the SENS 60 registers with the operating system for certain event notifications. However, rather than after the event starts, when the SENS 60 receives the logoff indication, the SENS 60 fires a logoff event (if a client is registered for notification) and then delays the logoff process until a client that has registered for logoff notification instructs the SENS 60 to continue. This allows a client to perform pre-logoff processing after the user has requested logoff but before the actual logoff operation occurs.

As can be seen from the foregoing detailed description, there is provided a centralized system event notification service that notifies registered clients of events. The method and system provide information such as network information that is otherwise unavailable or inconsistent in a consistent, efficient and extensible way.

While the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. One or more computer-readable storage media having executable instructions stored thereon that, when executed, implement a method comprising:
   receiving a request from a client to be notified of a state of at least one network destination as reachable or unreachable, wherein state data corresponding to the at least one network destination is maintained in a ping cache and wherein the state of the at least one network destination is returned from the ping cache to the client in response to the request;
   identifying each network destination corresponding to the request by a name or a corresponding Internet protocol address, and for each network destination that is identified by name only, attempting to resolve the corresponding name into the corresponding Internet protocol address;
   updating the state of the at least one network destination in the ping cache to reflect the at least one network destination is unreachable if the attempt to resolve the corresponding name of the at least one network destination fails;
   determining whether the corresponding Internet protocol address is associated with a local subnet if the corresponding Internet protocol address is identified or resolved;
   automatically updating the ping cache to reflect that the at least one network destination is reachable if it is determined that the corresponding Internet protocol address is associated with the local subnet and even though there is no guarantee that the network destination is reachable;
   periodically pinging the at least one network destination if it is determined that the corresponding Internet protocol address is not associated with the local subnet; automatically updating the ping cache to reflect any change in the state of the at least one network destination, as reachable or unreachable, and as determined by results of the periodic pinging; and
   wherein the request is generated when the client subscribes for an event notification corresponding to the state of the network destination and wherein the response comprises a notification corresponding to an event that is fired in response to the ping cache being updated to reflect said any change in the state of the at least one network destination.

2. The one or more computer-readable media of claim 1 wherein a central service publishes the event when the network destination changes from reachable to unreachable.

3. The one or more computer-readable media of claim 1 wherein a central service publishes the event when the network destination changes from unreachable to reachable.

4. A method implemented by a computing system that includes a processor and a memory storing instructions for implementing the method, the method comprising:
   receiving a request from a client to be notified of a state of at least one network destination as reachable or unreachable, wherein state data corresponding to the at least one network destination is maintained in a ping cache and wherein the state of the at least one network destination is returned from the ping cache to the client in response to the request;
   identifying each network destination corresponding to the request by a name or a corresponding Internet protocol address, and for each network destination that is identified by name only, attempting to resolve the corresponding name into the corresponding Internet protocol address;
   updating the state of the at least one network destination in the ping cache to reflect the at least one network destination is unreachable if the attempt to resolve the corresponding name of the at least one network destination fails;
   determining whether the corresponding Internet protocol address is associated with a local subnet if the corresponding Internet protocol address is identified or resolved;
   automatically updating the ping cache to reflect that the at least one network destination is reachable if it is determined that the corresponding Internet protocol address is associated with the local subnet and even though there is no guarantee that the network destination is reachable;
   periodically pinging the at least one network destination if it is determined that the corresponding Internet protocol address is not associated with the local subnet;
   automatically updating the ping cache to reflect any change in the state of the at least one network destination, as reachable or unreachable, and as determined by results of the periodic pinging; and
   wherein the request is generated when the client subscribes for an event notification corresponding to the state of the network destination and wherein the response comprises a notification corresponding to an event that is fired in response to the ping cache being updated to reflect said any change in the state of the at least one network destination.

5. The method of claim 4, wherein the ping cache is further updated from one or more other processes.

6. The method of claim 4, wherein the client is an application local to the computing system.

7. The method of claim 4, wherein the method further includes firing a separate event and sending a different notification to the client each of a plurality times the ping cache is updated to reflect a plurality of changes in the state of the at least one network destination.

8. The method of claim 4, wherein the method further includes providing the client with quality of connection information about the network destination along within the response to the request.

9. A computing system comprising:

a processor; and memory storing instructions for implementing a method, wherein the method includes:

receiving a request from a client to be notified of a state of at least one network destination as reachable or unreachable, wherein state data corresponding to the at least one network destination is maintained in a ping cache and wherein the state of the at least one network destination is returned from the ping cache to the client in response to the request;

identifying each network destination corresponding to the request by a name or a corresponding Internet protocol address, and for each network destination that is identified by name only, attempting to resolve the corresponding name into the corresponding Internet protocol address;

updating the state of the at least one network destination in the ping cache to reflect the at least one network destination is unreachable if the attempt to resolve the corresponding name of the at least one network destination fails;

determining whether the corresponding Internet protocol address is associated with a local subnet if the corresponding Internet protocol address is identified or resolved;

automatically updating the ping cache to reflect that the at least one network destination is reachable if it is determined that the corresponding Internet protocol address is associated with the local subnet and even though there is no guarantee that the network destination is reachable;

periodically pinging the at least one network destination if it is determined that the corresponding Internet protocol address is not associated with the local subnet;

automatically updating the ping cache to reflect any change in the state of the at least one network destination, as reachable or unreachable, and as determined by results of the periodic pinging; and wherein the request is generated when the client subscribes for an event notification corresponding to the state of the network destination and wherein the response comprises a notification corresponding to an event that is fired in response to the ping cache being updated to reflect said any change in the state of the at least one network destination.

* * * * *